June 4, 1940.  W. G. GREEN  2,203,140

METHOD FOR SEISMIC PROSPECTING

Filed Feb. 27, 1937  3 Sheets—Sheet 1

INVENTOR
William G. Green.

June 4, 1940. W. G. GREEN 2,203,140
METHOD FOR SEISMIC PROSPECTING
Filed Feb. 27, 1937  3 Sheets-Sheet 3

INVENTOR
William G. Green

UNITED STATES PATENT OFFICE 2,203,140

METHOD FOR SEISMIC PROSPECTING

William Gladstone Green, Tulsa, Okla.

Application February 27, 1937, Serial No. 128,272

3 Claims. (Cl. 181—0.5)

This invention has to do primarily with improvements in methods of setting up seismic disturbances at selected points within the crust of the earth for various purposes.

The invention is particularly applicable to the methods of prospecting the subsurface structure of the earth by means of seismic waves. In the practice of these methods it is customary to generate elastic waves at a given location and to record the resulting vibrations at another location so that the nature of the intervening sections of the earth's crust between the two locations may be studied from the records formed. Therefore in all the variations of this method, one finds a source of shock which sends out elastic waves, and several seismographs disposed over the ground which receive the waves.

The only method now used in practice consists in firing a charge of a violent explosive. Part of the waves originated by the explosion reach the seismograph after having travelled only near the surface. These direct waves are of little interest to geophysicists and an effort is made to eliminate these waves from the records. Another part of the waves penetrate into the underground and strike a subsurface formation which possesses physical characteristics such that the velocity of the wave propagation through it is different. Consequently such a subsurface formation may reflect, refract, and diffract the aforesaid wave trains and change the direction of their travel and return them to the surface of the earth.

One of the methods of seismic prospecting makes use of the reflected waves. Thus in order to determine the structure of a subsurface formation one measures the time necessary for a seismic wave produced by a superficial explosion to travel downwards and to return to the surface of the earth after reflection from the subsurface formation.

In the study of the seismic wave paths particular attention should be given to the uppermost layer of the earth (usually about 20–100 feet deep) consisting of an unconsolidated stratum disintegrated by various atmospheric and biological agents and usually designated as the "weathered zone." Experience has shown that the waves travelling in the weathered zone are comparatively much more intense than the waves penetrating into the deeper formations and the large amplitude registrations which the waves travelling in the weathered layer may record on the seismogram, frequently hide or obscure the desired reflected waves. Consequently the record of the earth motion may fail to give reliable results unless special provisions are made to accentuate the waves that are to be reflected and reduce the strength of the waves travelling horizontally in the weathered layer. This can be done by increasing the efficiency of the explosion downwards, and reducing the efficiency of explosion for the waves travelling horizontally in the weathered layer. Thus in the methods used at the present time the explosive charge is placed at the bottom of a hole, preferably the hydrostatic level (see U. S. Patent #1,978,668, issued to Kenneth E. Burg), or below the weather zone (see U. S. Patent #1,819,923, issued to Burton McCollum), i. e., in the first 20–100 feet of the underground. In such a manner the efficiency of the explosion is increased downwards, a further advantage being a substantial reduction in the amount of explosives used (in the rate of up to 100 to 1).

In the above methods it is necessary to drill holes usually to the depth of 20–100 feet in order to attain the subsurface stratum of desired characteristics at which the explosion is produced. The drilling of holes presents several serious inconveniences and requires an additional equipment, labor, and expense, which increases considerably the cost of exploratory work and in some instances may render it unprofitable.

It is therefore the object of the present invention to obviate the inconveniences of the prior art and to produce a method for seismic prospecting in which the drilling of holes will be eliminated.

It is a further object of the present invention to produce a method in which the efficiency of the energy transmission downwards is increased.

It is a further object of my invention to provide a method in which the elastic waves are created by a direct impact upon the surface of the earth.

Further purposes appear in the specification and in the claims.

In accordance with my invention I have been able to produce elastic waves by a direct impact upon the surface of the earth, whereby I have transmitted a sufficient amount of energy downwards in order to obtain records in which the reflected waves are easily identifiable.

The novelty of my invention does not reside in the increased amount of energy imparted to the earth and I do not believe that a practical method may be developed for producing impacts upon the surface of the ground by merely increasing the amount of energy involved. The prior attempts of generating seismic waves in which dynamite was placed directly on the surface of the earth have shown that enormous amounts of energy would be necessary in order to produce results comparable with those with dynamite buried below the weathered zone.

In my method I am taking into account two factors. The first factor consists in controlling the direction of the transmitted energy by imparting a directional blow. In particular I desire to increase the energy transmission in the downward direction and accordingly I have provided a method in which an impact upon the surface of the earth is provided in the vertcal direction. The second factor consists in controlling the type of time function according to which the energy is applied. This is done by shaping the imparted impulse so as to produce a wave that is readily transmitted downwards into the deeper consolidated formations.

It is well known by those skilled in the art that the imparted impulse can be represented in the form of a Fourier integral and may be considered as a continuous spectrum of frequencies distributed according to a predetermined law. It is also well known by those skilled in the art that certain wave frequencies transmit themselves more easily through the consolidated subsurface and constitute the predominant components of the spectrum of the reflected waves which return from the deeper subsurface formations while other wave frequencies transmit themselves more easily through the weathered layer and constitute the predominant components in the spectrum of the waves travelling through the weathered layer. Thus experience has shown that in the reflected waves the frequency in the range of 30 to 50 cycles per second will be emphasized and the components corresponding to the lower frequencies reduced in intensity.

It is therefore obvious that the novelty of my invention does not reside in increasing the amount of energy imparted to the earth, but in directing the impact downwards and in improving the frequency spectrum of the produced impulse, in order to increase the amount of energy that travels downwards to the detriment of the energy that travels horizontally through the weathered layer.

In accomplishing the above referred results I make use of a principle by means of which the pressure variation of the imparted impulse can be predetermined in advance so as to possess the optimum frequency spectrum.

The principle which I make use of consists in causing a gas pressure in a closed chamber to build itself up until a predetermined critical value is reached, and in breaking a mechanical element by the critical pressure, thus releasing automatically the gases which are adapted to impart a pressure upon the surface of the earth or to throw a projectile upon the earth surface. It is understandable that the variation of the applied pressure with time depends upon various physical factors inter-related. Among those, the disruptive strength of the mechanical element determines the maximum pressure released. It should be also taken into account that the disruption does not take place instantly but occurs during a certain predetermined time interval during which the pressure is gradually released. Thus by selecting the proper mechanical elements I have been able to choose the optimum value of the pressure released and also to select the length of the time interval during which the pressure is applied so that the resultant impact will possess an optimum frequency distribution, i. e., in which the 50 cycle component will constitute a predominant part.

My invention will be explained more in detail in connection with the attached drawings in which I show two embodiments of the invention which have been chosen with a view to simplicity of operation and convenience of illustration of the principles involved.

Figure 1:
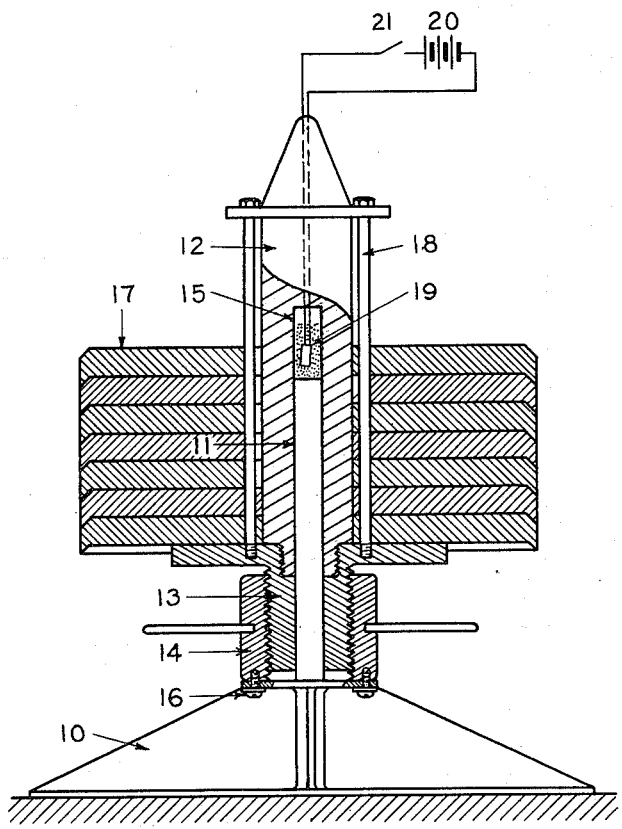
Figure 1 represents an apparatus for producing an impulse upon the earth surface.

Referring now more particularly to Figure 1 there is shown an arrangement for effecting a direct impact upon the surface of the earth. It consists essentially of a base plate 10 resting upon the earth surface, of a piston rod 11 rigidly connected to the base plate and of a gun barrel 12 slidable upon piston rod. An extension barrel 13 is provided with a large nut 14 for the purpose of adjusting the combustion chamber 15 for various charges. The shear bolts 16 are connected through a small plate integral with base and piston rod 11 into the large nut 14. Large cast iron weights 17 are placed on large plates of extension barrel 13 and bolts 18 are included to strengthen the coupling between the barrel 12 and the extension barrel 13. The combustion chamber 15 contains powder and is provided with an electrical fuse 19 for igniting the powder. The electrical fuse is included in an electrical circuit containing a battery 20 and a switch 21.

The operation of the apparatus can be explained as follows: At the instant at which it is desired to produce an impact upon the surface of the earth the switch 21 is closed. This energizes the electrical circuit and causes the ignition of the fuse. The powder begins to burn within the chamber 15 and develops an increasing pressure upon the piston rod 11 and upon the barrel 12 respectively. At a certain moment the critical pressure is reached and the shear bolts 16 are disrupted. The pressure is then transmitted through the piston rod 11 and base 10 and applied to the surface of the earth.

The fundamental features of my invention include the method of tying the barrel 12 and base 10 with shear pins 16, and to the method of preventing any movement of the base 10 until a certain predetermined amount of powder has been burned and a certain predetermined pressure reached.

Figure 2A:
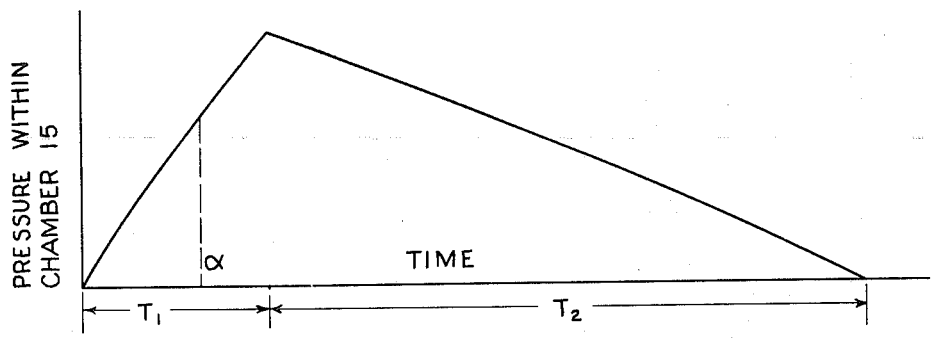
Fig. 2a represents the pressure-time variation developed by burning powder.
Figure 2B:
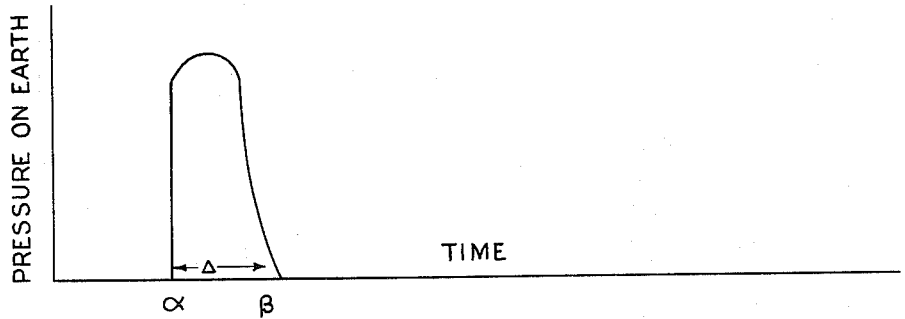
Fig. 2b represents the force exerted by the powder upon the surface of the earth.

In such a manner I have been able to provide an impulse in which the length of the time interval during which pressure is applied can be controlled at will. This is illustrated in Fig. 2a and Fig. 2b. For a better understanding of this figure assume that the disruptive strength of the shear bolts 16 has been chosen to be very great and above the maximum force developed by the burning powder. Under these conditions the chamber 15 in which combustion occurs can be considered as a confined volume. Graph 2a shows the manner in which the pressure developed by the burning powder varies with time. The steeply rising pressure curve corresponding to the time interval $T_1$ represents the burning process while the decaying pressure curve occurring during the time interval $T_2$ occurs during the cooling process.

Assume now that the size of the shear bolt has been so selected that the disruption occurs for forces that are developed by the burning powder during the process of combustion and let the force exerted by the pressure at the instant $\alpha$ disrupt the shear bolt. This is illustrated in the graph 2b. Prior to the instant $\alpha$ the gas developed by the burning powder is confined entirely within the chamber 15 and does not exert any pressure at all upon the surface of the earth. At the instant $\alpha$ the disruption of the shear pins takes place and the pressure is suddenly released as shown in Figure 2b. Since it is assumed that the burning process of the powder consumes a time interval $T_1$ larger than $\alpha$ the pressure continues to increase after the disruption takes place. This pressure is applied downwardly against the earth through plate 10 and upwardly against the mass 17. The mass 17 rises allowing the volume in the chamber 15 to increase and consequently the pressure to drop off at the instant $\beta$ as is shown in Figure 2b. It is apparent that the instant $\beta$ at which the disruption of the shear bolt occurs depends upon the strength of the said shear bolts. It is also apparent that the instant $\beta$ at which the pressure is removed (since the decay of the pressure is very rapid it will be assumed that it takes place instantaneously) depends upon the magnitude of the mass 17. Consequently the time interval during which the pressure is applied to the earth $\Delta = \beta - \alpha$ depends both upon the dimensioning of the shear bolt 16 and the mass 17; a small value of $\Delta$ corresponding to shear bolts having a great disruptive strength and a mass 17 of small mass. A large value of $\Delta$ corresponding to shear bolts having a small disruptive strength and a mass 17 of a large mass.

Consequently by properly proportioning the size and thickness of the shear pins and the magnitude of the mass 17 I can determine the optimum value of the time $\Delta$ during which the pressure is applied to the earth.

Figures 3, 3A:
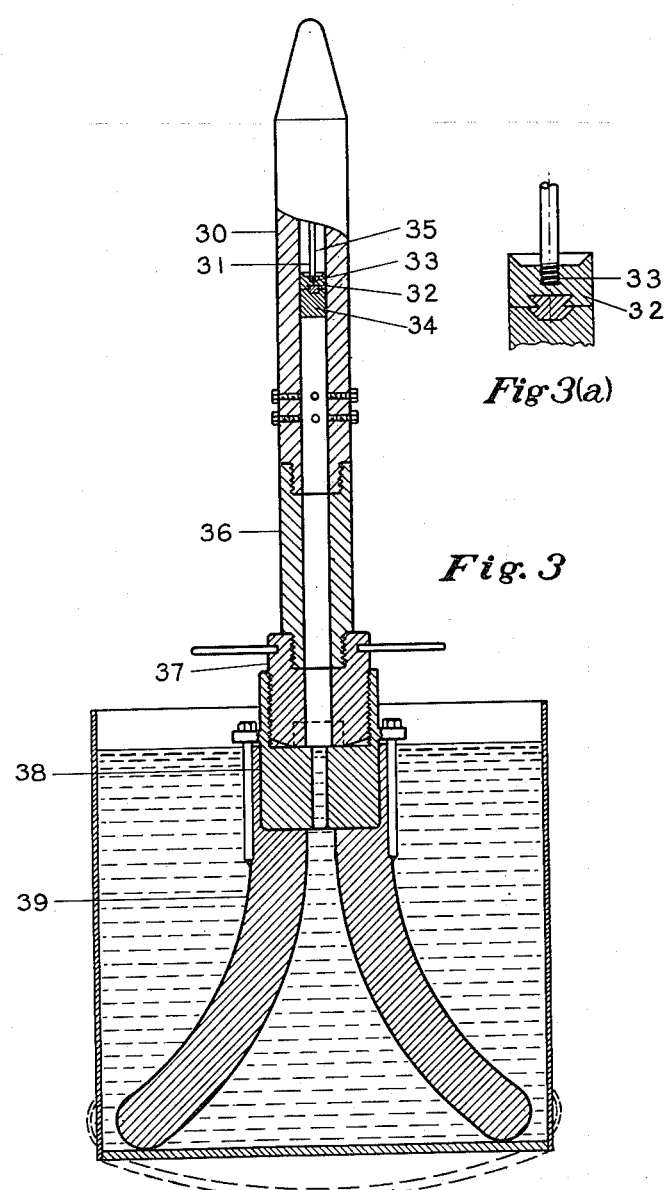
Fig. 3 represents a modified apparatus for producing an impulse upon the earth surface.
Fig. 3a represents a fragment of the apparatus shown in Fig. 3.

Figure 3 represents a modified embodiment of the invention in which 30 designates a barrel similar to the barrel 12 in Figure 1, 31 designates a piston rod which is connected to the piston 32 by means of a threaded shear bolt 33. Figure 3a shows a fragment of Figure 3 which includes the engagement between the threaded shear bolt 33 and the piston 32. The lower part of the piston 32 is of a different material and constitutes the projectile 34. The combustion chamber is shown at 35; it contains a certain amount of powder and an electrical fuse for igniting the powder (not shown in the figure). An appropriate electrical circuit (not shown in the figure) for energizing the fuse is provided and is similar to the one shown in Figure 1. An extension barrel 36 is coupled directly to a large bushing 37 which in turn is cored to another bushing 38. The bushing 38 is fastened to a large bell casting 39, the inside walls of which diverge exponentially. The bell casting 39 is placed into a large tub filled with water to a point high in the throat of the large bushing, the water being on the inside and the outside of the casting making it very easy to maintain correct water level and note any seepage.

The operation of the device can be explained as follows:

At the instant at which it is desired to produce the impact upon the earth surface a current is sent through the fuse and causes powder to burn in the chamber 35. The powder develops an increasing pressure upon the piston 32. At a certain moment a certain critical pressure is reached, at which the shear bolt 33 is disrupted which releases the projectile and causes it to move downwards and to strike the water in the bell casting. The impact of the projectile 34 upon the water develops a very high pressure upon the throat of the bushing this pressure being transmitted equally to every square inch of the large bell casting and to the ground contacted by the water.

Figure 4:
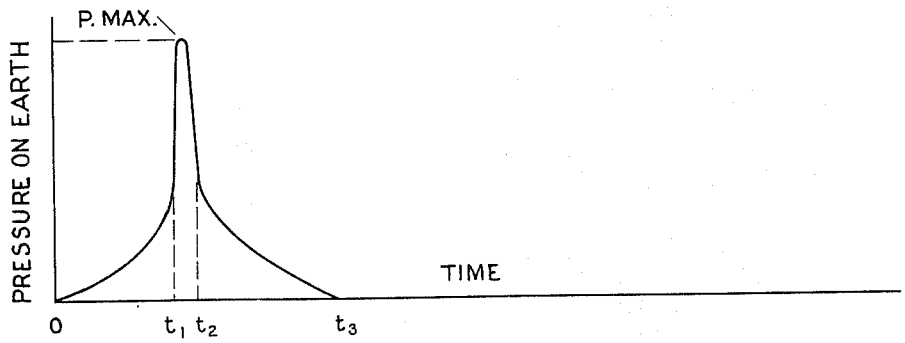
Figure 4 represents a diagram explaining the operation of the apparatus shown in Figure 3.

The fundamental feature embodied in this includes means for tying the projectile 32 and the piston rod 31 by means of shear pins 33 and to retard any movement of the piston 32 and the projectile 33 until a certain predetermined pressure has been reached. In such a manner I have been able to control the amount of kinetic energy released by the powder. The manner in which this energy is applied upon the surface of the earth can be better understood in connection with the diagram of Figure 4 in which the abscissas represent the time and the ordinates represent the pressure applied to the ground.

Let $t = 0$ correspond to the instant at which the projectile is released. During the travel of the projectile in the downward direction a certain amount of air is compressed by the projectile and causes a rapidly increasing pressure to be applied down to the surface of the water. In the pressure-time diagram of Figure 4 this corresponds to the time interval from $t = 0$ to $t = t_1$. At the time $t_1$ the projectile strikes the water and the pressure suddenly increases to the value P-max. This pressure is maintained at the value P-max during the time interval between $t = t_1$ and $t = t_2$. The projectile 34 is made of relatively plastic metal (lead for example) and under the violent impact upon the orifice of the bell it enters the body of water and separates itself from the piston 32. At the same instant the water pressure suddenly drops to a comparatively small value. The piston is arrested above the orifice of the bell and is intended to seal within the barrel.

Referring now again to Figure 3 it is apparent to those skilled in the art that by proportioning the amount of powder, the disruptive strength of the shear bolt 33, the height of the cylinder in which the projectile travels in the downward direction, the material of which the projectile is made, the size of the orifice of the bell, I am able to control the shape of the impact and to select such design constants which correspond to the optimum frequency distribution and enable to provide a method of increasing the amount of energy transferred downward to the detriment of the energy transmitted along the weathered layer.

In view of my invention and disclosure, variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention, what I claim as new and desire to secure by Letters Patent is:

1. In the method of geophysical prospecting in which a charge of explosive is detonated to create seismic waves of a plurality of frequencies, selected frequencies of said waves being detected after their reflection from the interfaces of the substrata and signals corresponding to the detected waves being recorded, the novel steps of improving the frequency spectrum of said seismic waves by generating an increasing pressure within a confined zone above the earth's surface, confining said pressure within a portion of said zone out of compressive contact with the earth's surface until said pressure has attained a predetermined value, thereafter abruptly releasing the pressure of said predetermined value and applying this pressure uniformly over a definite area upon the earth's surface in a direction perpendicular to the earth.

2. In the method of geophysical prospecting in which a charge of explosive is detonated to create seismic waves of a plurality of frequencies, selected frequencies of said waves being detected after their reflection from the interfaces of the substrata and signals corresponding to the detected waves being recorded, the novel steps of emphasizing the frequency of the seismic waves in the range of 30 to 50 cycles per second and reducing in intensity components corresponding to the lower frequencies of these waves by generating an increasing pressure within a confined zone above the surface of the earth, confining said pressure within a portion of said zone out of compressive contact with the earth's surface until said pressure has attained a predetermined value proportionate to the desired frequency of 30 to 50 cycles per second of the resulting seismic wave thereafter abruptly releasing said pressure of the predetermined value and applying this pressure uniformly over a definite area upon the earth's surface in a direction perpendicular to the earth.

3. In the method of geophysical prospecting in which a charge of explosive is detonated to create seismic waves of a plurality of frequencies, selected frequencies of said waves being detected after their reflection from the interfaces of the substrata and signals corresponding to the detected waves being recorded, the novel steps of emphasizing the frequency of the seismic waves in the range of 30 to 50 cycles per second and reducing in intensity components corresponding to the lower frequencies of these waves by generating an increasing pressure within a confined zone above the surface of the earth, confining said pressure within a portion of said zone out of compressive contact with the earth's surface until said pressure has attained a predetermined value, thereafter abruptly releasing said pressure and applying said pressure through said confined zone directly downward over a definite area upon the earth's surface to thereby produce downwardly directed seismic waves having energy characteristics predetermined by said value and interposing a hydraulic pressure medium in the path of said application of released pressure upon the earth's surface.

WILLIAM G. GREEN.